Patented Sept. 18, 1945

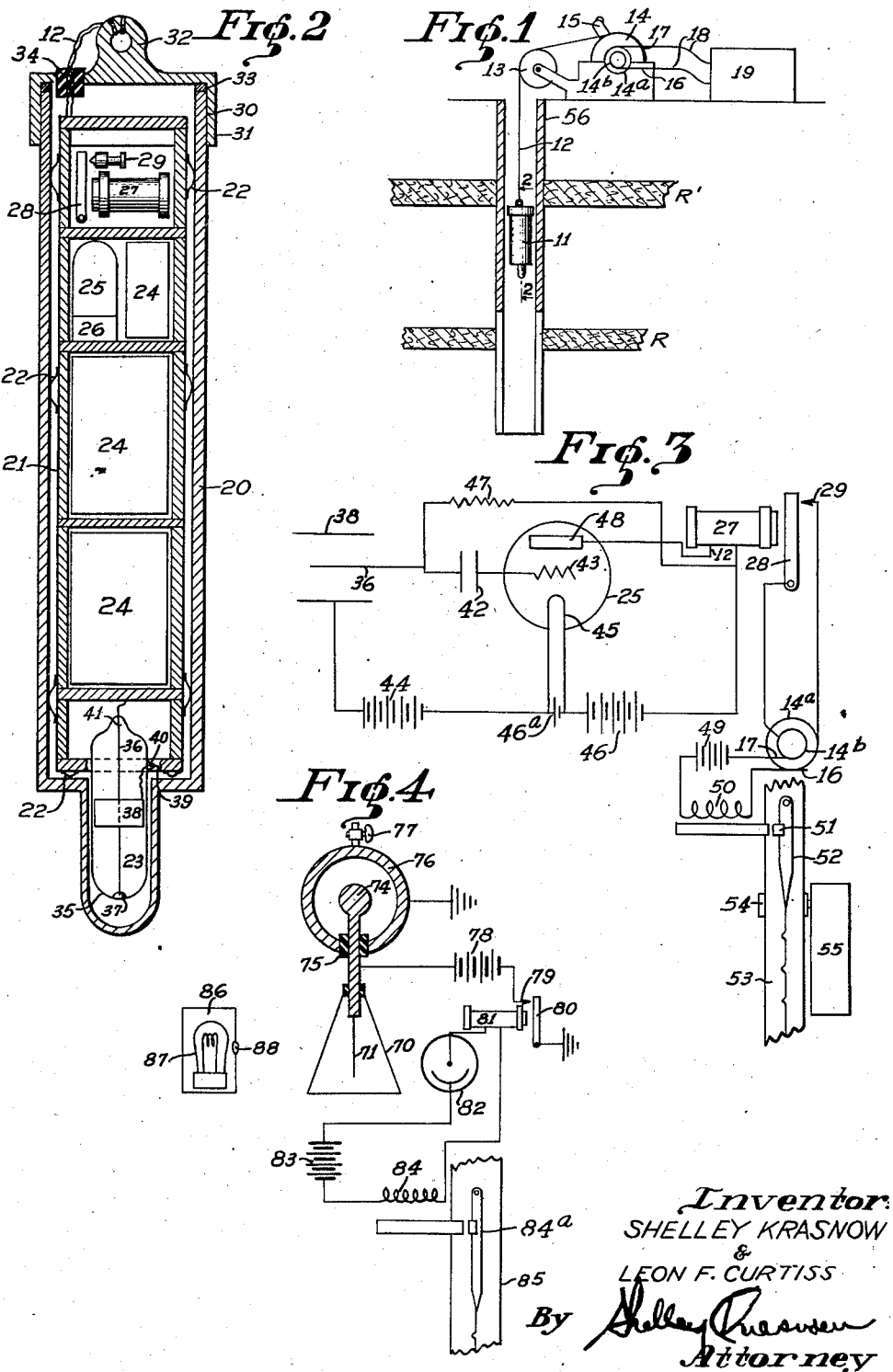

2,384,840

UNITED STATES PATENT OFFICE 2,384,840

RADIOACTIVE WELL LOGGING METHOD AND APPARATUS

Shelley Krasnow, New York, N. Y., and Leon F. Curtiss, Montgomery County, Md., assignors to Geophysical Development Corporation, Washington, D. C., a corporation of Delaware Original application April 16, 1937, Serial No. 137,380. Divided and this application October 20, 1941, Serial No. 415,826

4 Claims. (Cl. 250—83.6)

This invention relates to an improved method and apparatus for measuring radioactivity, and has particular reference to a method and apparatus for measuring radioactivity in inaccessible locations, such as in boreholes or at considerable depths in bodies of water.

One object of the invention is to provide a method and apparatus useful for locating deposits of minerals having radioactive properties. Another object of the invention is to provide an apparatus by which one may measure radioactive properties continuously from the top to the bottom of a borehole, and have both an immediate indication and a permanent record of the radioactivity at various depths.

In locating deposits of radioactive minerals it is often the custom to drill a number of boreholes in localities where such deposits might exist. It is further the practice to bring samples or cores of the drilled material to the surface of the earth, and there examine them for radioactivity by well-known methods and apparatus. This method has several drawbacks. First, a deposit of ore may exist close to the borehole, but not be traversed by it, by which the deposit will be missed. Second, it is possible to make an error in ascertaining the exact depth from which a core or sample has been taken. Finally, it is rarely possible to bring all of the core to the surface, a certain percentage always being lost in the drilling or handling.

It is further known that deposits of petroleum are often markedly radioactive as compared with the surrounding rock material. This is believed to be due to the superior absorptive property of petroleum for radium emanation. Natural gas and ground water are also known to be somewhat more radioactive than their surrounding rock material. In drilling for either petroleum or natural gas or ground water, it is desirable to know the exact level at which the strata having these are traversed by the drilled hole. This is often difficult to determine, particularly when drilling has been done by the "rotary" method, in which the use of mud under pressure tends to wall off the strata. Often, too, the drilled hole will be lined with a metallic casing, which casing by accident or intention may seal off strata having the desired fluid.

It is an object of the invention described to obviate the difficulties mentioned above.

Reference is had to the accompanying drawing in which:

Figure 1 shows a form of apparatus for measuring radioactivity at various depths in a borehole.

Figure 2 shows a cross-sectional view of the element 11 shown in Figure 1, taken across the plane 2—2.

Figure 3 shows the circuit diagram of the apparatus shown in Figure 1.

Figure 4 shows the circuit diagram for another measuring radioactivity within a borehole.

A convenient form of the apparatus shown in Figure 1 employs a cartridge 11 suspended in the borehole by a conducting cable 12. The cable 12 passes over a measuring wheel 13 and thence onto a reel 14 operated by a crank 15. A pair of slip-rings 14a and 14b fastened to the shaft of the reel 14 have bearing upon them the brushes 16 and 17. These brushes are connected through the medium of wires 18, 18, to a recording element 19. Referring now to Figures 5 and 6, the cartridge 11 consists essentially of a radioactive-sensitive member 23 mounted at the bottom of a pressure-tight cartridge 20. A rack 21 holds the element 23 and serves further to hold batteries 24, vacuum tube 25, and relay 27. Springs 22 serve to prevent violent contact of the frame 21 with cartridge 20. A cap 31 is fastened by means of a threaded or other connection 30 onto one end of cartridge 20. A fluid-tight seal is had by the use of gasket 33. The wires necessary to convey the signals from the cartridge 11 pass through insulating bushing 34 and are looped onto ring 32 and thence pass to the surface. In this way the wire serves also for raising and lowering member 11.

The sensitive element 23 consists essentially of a sealed glass vessel 35 which has within it a conducting ring 38 connected to wire 39 passing through seal 40. Through the axis of ring 38 there passes another conducting member 36, in the form of a wire or filament. This member 36 passes through seal 41 and is further anchored against mechanical movement by being fastened to the bottom of the vessel at 37. Container 35 is filled with any desired gas such as air, at a pressure which may be as little as a few centimeters of mercury or as much as atmospheric, and is then sealed off, after which it may be used for long periods of time without further attention. In operation the members 36 and 38 are kept at a high potential relative to each other by means of batteries 46 and 44 operating through high resistance leak 47, as shown in Figure 3. A suitable value for the voltage of battery 46 is 135 volts; of battery 44, 360 volts. The positive end of battery 44 is connected to one side of the filament 45 of vacuum tube 25. The member 36 is connected to a blocking condenser 42 and thence to the grid 43 of the same vacuum tube. The plate 48 of this tube is connected through relay 27 to the positive end of battery 46. The relay 27, when de-energized, serves to close contacts 28 and 29, thus allowing a current to flow through wires 12, slip-rings 14a and 14b, brushes 16 and 17, electro-magnet 50 and battery 49. The electro-magnet 50 serves to attract armature 51 which further serves to move pen 52 across the tape 53 kept in constant uniform motion by means of drum 54 operated by driving means 55.

The operation of the apparatus is as follows: The members 36 and 38 are charged at a controlled rate to a high potential relative to each other by means of the batteries 46 and 44 operating through leak 47. In the presence of radioactive material the gas in the container 35 will be partially ionized and will thus change the potential of the member 36. This will result in a change of potential of the grid 43 which will reduce the current normally flowing between filament 45 and plate 48 of vacuum tube 25. This will in turn reduce the current in relay 27 sufficiently to allow its armature 28 to be retracted, closing the circuit between member 28 and contact 29. The output circuit will be intermittently closed by this operation. Thus the relay will operate intermittently, conveying responses conditioned by the intensity of radioactivity. Each operation produces a current pulse whose frequency characteristics are modified in accordance with radioactivity. The closing of this circuit will cause a current to flow through slip-ring 14b, brush 17, battery 49, electro-magnet 50, brush 16, and slip-ring 14a. The energizing of electro-magnet 50 will cause armature 51 to move pen 52, causing a break in the line traced on tape 53.

Upon the operation of the circuit in this fashion, the potential of member 36 will be restored to its original value, increasing the filament-to-plate current in tube 25, energizing relay 27 and thereby causing the circuit made by members 28 and 29 to open.

Upon the further ionization of the gas in container 35 the operation above described will be repeated. Thus, the frequency of the pulses finally received by pen 52 will be a measure of the radioactivity of the material in the vicinity of member 23. The frequency of the pulses constitutes a characteristic or property thereof related to the intensity of radioactivity within the borehole. It will be noted that the rays given off by radioactive substances have considerable penetrating power and can therefore easily penetrate the shield 20 even if the latter be made of metal. To reduce the absorption of these rays by the metal, however, that portion of the cartridge 20 which houses the member 23 is provided with thinner walls than the remainder; a construction made possible by the smaller diameter of the said portion. It will be noted further that even if a metallic casing such as 56 exists in the borehole the presence of a radioactive layer such as R' may be noted because of the easy penetration of the rays through the thickness of metal ordinarily employed for casing.

Another type of apparatus is shown schematically in Figure 4. In this, means are provided to charge the electroscope periodically on its charge falling off by a definite amount. The frequency with which the electroscope is charged is a measure of the ionization current flowing and thus of the intensity of radiation in the vicinity. The current obtained has a value dependent upon the intensity of radioactivity. Specifically, the apparatus consists of an ionization chamber having an outer conducting wall 76 into which is fastened a stopcock 77 through which a suitable gas, such as air, may be passed into the chamber. An electrode 74 passes through an insulator 75 and thence into the electroscope 70. A lamp 87, surrounded by a light tight housing 86, and having a focusing lens 88, casts a beam of light on photo-cell 82. This beam will fall on the photocell 82 only if the leaf 71 is in the discharged position. In such event a current passes through cell 82, relay 81, electro-magnet 84, and energizing battery 83. The photocell 82 is actuated by the electroscope acting as a voltage indicator whenever the voltage has changed by a predetermined amount. In the described method of operation, the photocell is intermittently operated. The responses conveyed from this intermittently operated element are conditioned by the intensity of radioactivity. The battery 83 maintains a reference voltage, to keep the electrodes charged to a definite predetermined potential. The operation of the relay 81 closes contacts 79 and 80, thus causing battery 78 to recharge the electrode 74, and thus leaf 71. The external voltage of battery 78 is repeatedly applied whenever the voltage indicated by leaf 71 has departed from the reference voltage of the battery by a predetermined amount. Whenever this event occurs, pen 84a is caused to move across chronograph tape 85, and thus produce a kink in the line traced by the pen. The frequency of these kinks is therefore, a measure of the radioactivity in the vicinity of chamber 76. Thus, the character of the intermittent pulses is determined by the current flow through the ionization chamber, or expressed in other words the characteristics of the impulses are determined by the value of the current. The frequency characteristics or nature of the pulses are modified by and in definite relation to the current flowing between the electrodes within the ionization chamber. It will also be seen that the characteristics of the impulses are varied in proportion to the voltage, as indicated by the position of leaf 71. In the operation described, the output circuit will be intermittently operated by the photocell and will produce current pulses whose frequency characteristics are modified in accordance with the radioactivity. This characteristic is a property related to the intensity of radioactivity within the borehole.

In the types of apparatus shown in Figure 2 and Figure 4, the chronograph and entire recording system may be clock operated and mounted in the cartridge so that no conducting wires need pass to the surface. As a further alternative, the motion of the tape may be made not a function of time, but rather of the position of a measuring wheel such as 13. In the apparatus shown in Figure 4, the elements shown as 83, 84, 84a, and 85, may be mounted at the surface of the ground, similar to the mounting of element 19 in Figure 1; the rest of the apparatus being mounted in a cartridge suitable for lowering to the desired location. Thus, all of the elements shown in Figure 4, with the exception of members 83, 84, 84a, and 85, would be enclosed within a cartridge and lowered into the borehole. These last named elements would be at the surface of the ground as with similar members shown in Figure 1.

The apparatus shown in Figure 2 particularly, may be made extremely sensitive to the rays emitted by radioactive substances and so the sometimes faint radioactivity of the petroleum, natural gas and ground water detected. As has been pointed out previously, this may be done in spite of any covering of mud or of metallic casing intervening between the walls of the borehole and the cartridge 11. It is in fact, possible to run the cartridge 11 inside of the standard drill pipe used in rotary drilling and thus make measurements with a minimum of disturbance to drilling. Because of the limited absorptive power of the metals customarily used for drilling, it will still be possible to detect radioactive rays through the thickness of metal in the drill pipe, or even through the several inch thickness of the drilling tools.

While, from what has been disclosed above, it is evident that strata may be differentiated from each other by means of the quantitative difference in the amount of associated radioactive material, it will be appreciated that strata need not necessarily be widely different in their associated radioactivity to enable one to differentiate them from one another. In cases where the associated radioactivities are not conspicuously different in conducting measurements from one end of the borehole to the other, valuable information may still be obtained by considering the manner in which the radioactivity varies, or phrased differently, the function by which radioactive intensity changes as the depth is altered. This will be found particularly valuable in searching for oil deposits. It will be recalled that petroleum deposits in the natural state have water associated with them. In many cases the water underlies the petroleum, and will have a radioactivity markedly different from that of the petroleum itself. Thus if an apparatus, as described above, were lowered past a formation, a sudden change would be observed in passing from rock to petroleum, another sudden change in passing from petroleum to water, and still another sudden change in passing from water to rock. The layers might thus be easily identifiable despite the fact that their radioactivity may be no greater or less than that of most of the rock lining the borehole.

It is obvious that any other means than those shown or described may be used to convey the frequency of the impulses produced by the apparatus in Figure 2 or in Figure 4, to the surface.

This is a division of our co-pending application, Serial No. 137,380, filed April 16, 1937.

The scope of the invention is indicated by the appended claims.

We claim:

1. Apparatus for radioactive investigation of drill holes comprising a holder having narrow lateral dimensions and adapted to be inserted in the drill hole, an ionization chamber mounted upon the said holder, the said ionization chamber having means to admit gas within the chamber and to permit closure after the gas has been introduced, means to charge the elements of the ionization chamber, thereby obtaining a current whose value is dependent upon the intensity of radioactivity in the vicinity, a magnetically operated switch mounted proximate to the ionization chamber, adapted to give a series of impulses, the characteristics of the impulses being determined by the rate of dissipation of the charge in the ionization chamber, transmitting means connected to the magnetically operated switch, serving to transmit impulses therefrom to the surface of the earth, means to measure the position of the holder in the drill hole, recording means at the surface of the earth receiving the said impulses, the said recording means including a marking member to mark a record, a record chart to receive the said record, and means to move the record chart while recording is taking place whereby a record of the radioactivity as related to position within the borehole is obtained.

2. In an apparatus for measuring radioactivity in a deep narrow borehole, a holder having narrow lateral dimensions and adapted to be inserted in the drill hole, an ionization chamber mounted thereon, a voltage indicator responsive to the drop of voltage in the ionization chamber, means actuated by the voltage indicator when the voltage has changed by a predetermined amount, additional means actuated when the voltage has changed by the said predetermined amount serving to impose an external voltage to counteract the voltage change, and recording means actuated upon the actuation of the voltage imposing means, serving to record a value indicative of the flow of current through the ionization chamber, the recording means including a record chart, means to move the said chart while recording is taking place, and a marker serving to mark a record upon the said chart and means to measure the position of the holder in the drill hole, whereby a record of the radioactivity as related to position within the borehole is obtained.

3. In an apparatus for measuring radioactivity within a borehole, a holder having narrow lateral dimensions and adapted to be inserted in the drill hole, an ionization chamber mounted thereon adapted to be lowered within the borehole and to be responsive to radiations produced within the borehole, a source of electrical energy adapted to be connected to the said ionization chamber and to keep the electrodes charged to a definite predetermined potential, an intermittently operable switch proximate to the ionization chamber, operated by an additional source of energy and serving to give an output series of current pulses, the nature of the said current pulses being modified by the current within the ionization chamber, and transmitting means for transmitting the modified pulses to a point of observation, recording means including a record marking member capable of marking a record, a record chart capable of receiving a record thereon, and means to move the said chart while recording is taking place in correlation with the position of the holder in the borehole, thereby obtaining a record correlating depth within the borehole and radioactivity proximate to the said depth.

4. In an apparatus for measuring radioactivity in a deep narrow borehole, a mechanically operable switch actuated by a source of energy, a radioactive measuring system actuated by an independent source of energy, means to cause the actuation of the switch to produce a series of pulses, means connected to the radioactive measuring system to impart to the pulses a property related to the intensity of radioactivity within the borehole, all of the aforesaid elements being mounted upon a long narrow holder capable of fitting within the borehole, means to record the characteristics of the pulses as related to depth within the borehole, recording means including a record chart, means to move the chart in correlation with the depth of the holder in the borehole, and marking means serving to provide indicia upon the chart to indicate the correlation between the characteristics of the pulses and depth within the borehole.

SHELLEY KRASNOW.
LEON F. CURTISS.